June 20, 1961 E. L. HOPKINS 2,988,952
OPTICAL APPARATUS FOR MEASURING DIFFERENCES IN ELEVATION
Filed Nov. 4, 1958 3 Sheets-Sheet 1
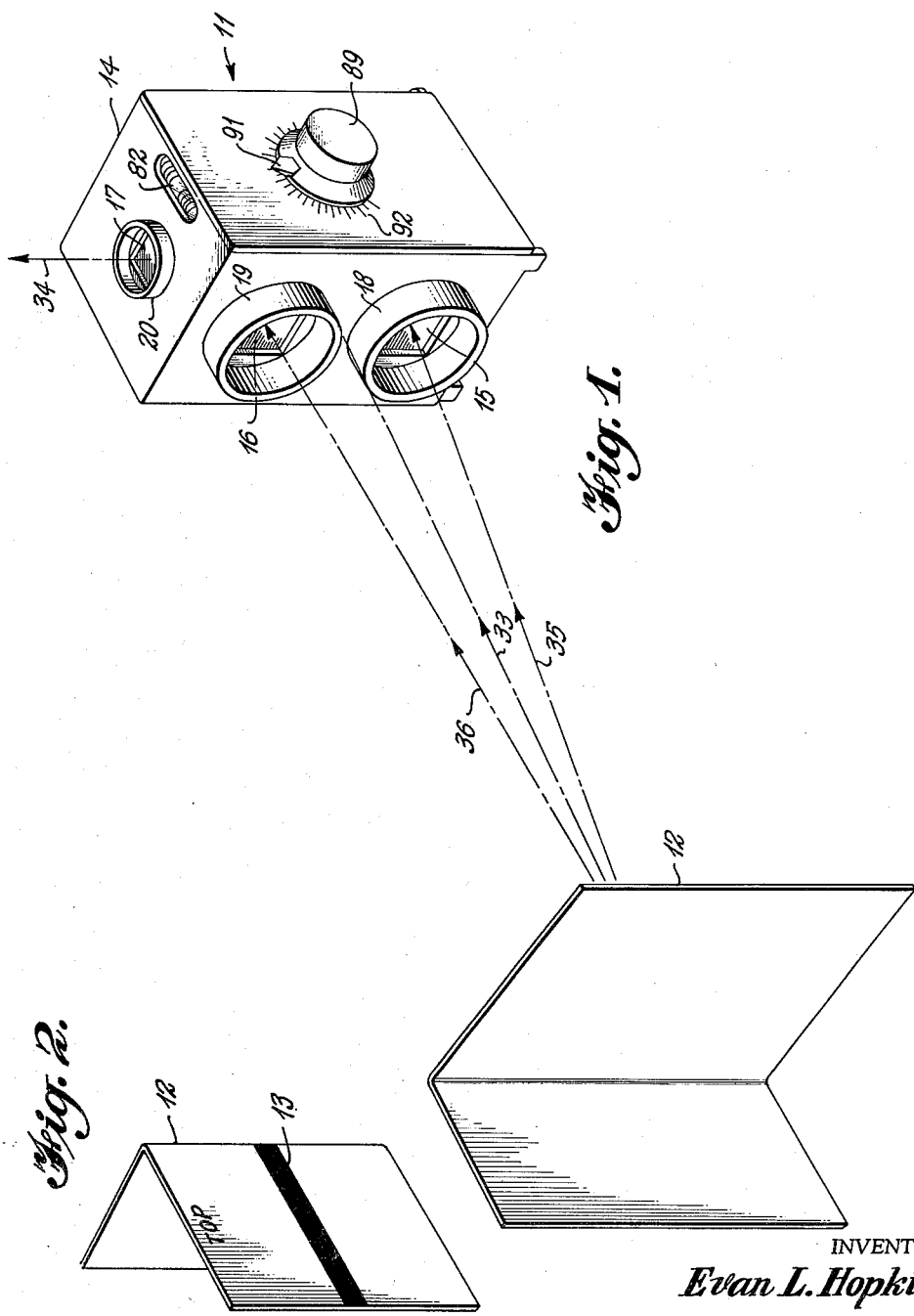
INVENTOR
*Evan L. Hopkins*
BY *Burns, Doane, Benedict & Irons*
ATTORNEYS

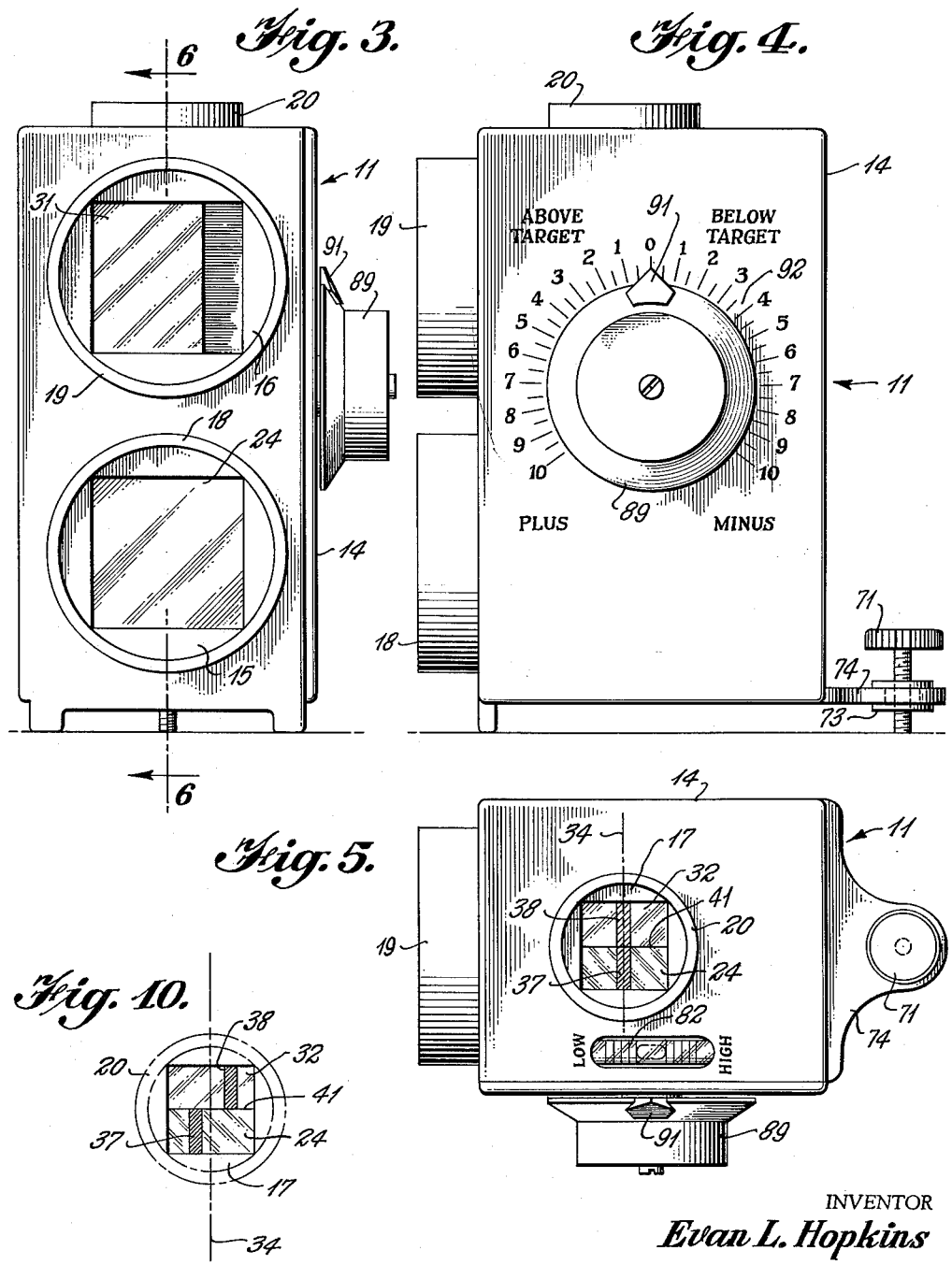

June 20, 1961 E. L. HOPKINS 2,988,952
OPTICAL APPARATUS FOR MEASURING DIFFERENCES IN ELEVATION
Filed Nov. 4, 1958 3 Sheets-Sheet 3
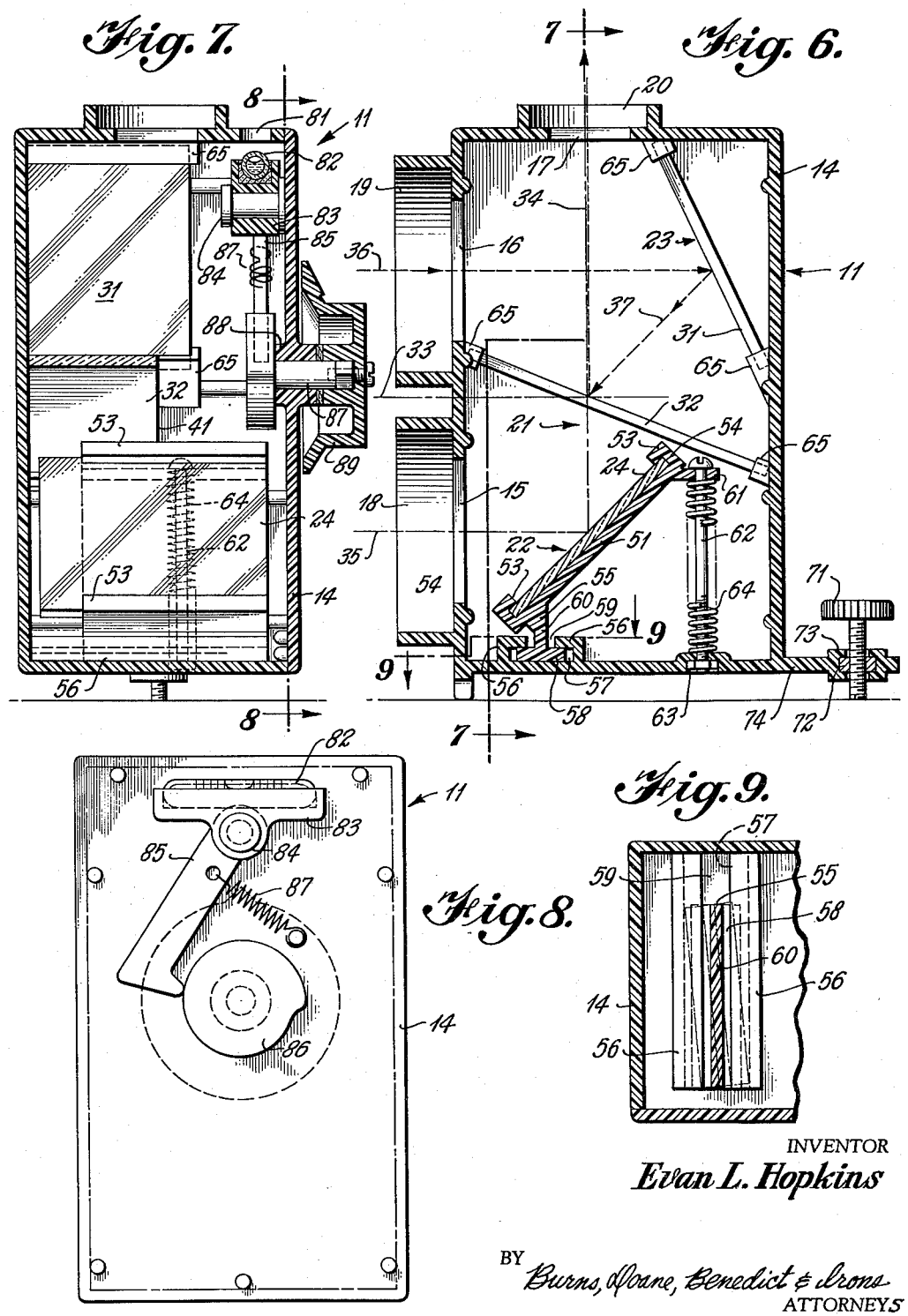
INVENTOR
*Evan L. Hopkins*
BY *Burns, Doane, Benedict & Irons*
ATTORNEYS United States Patent Office 2,988,952
Patented June 20, 1961

2,988,952
OPTICAL APPARATUS FOR MEASURING
DIFFERENCES IN ELEVATION
Evan L. Hopkins, Emporia, Kans., assignor to Hopkins Manufacturing Corporation, Emporia, Kans., a corporation of Kansas
Filed Nov. 4, 1958, Ser. No. 771,781
5 Claims. (Cl. 88—2.7)

This invention relates to apparatus for measuring differences in elevation, and more particularly by optical means.

There are many operations in which it is desirable to determine differences in elevation between spaced points in terms of either slope or linear distance. Where large areas are involved, as in many land surveying operations, complex and expensive instruments designed for use by professional surveyors are used. While such instruments are highly accurate and quite useful in extensive land surveying operations, they are impractical for use in certain limited operations, particularly where the measurements are performed by persons who are not skilled surveyors. Typical of such operations are measurements taken incident to grading for lawn or small building construction and the determination of the slope of a standard surface upon which vehicles are placed for headlight alignment testing. Various types of relatively small and compact instruments have been heretofore available for use in such limited operations. Frequently, however, such instruments are either not sufficiently accurate or, if accurate, are expensive, intricate and difficult to operate, calibrate and maintain by unskilled persons.

To overcome the disadvantages of prior art devices, a primary object of this invention is to provide an improved light and compact optical instrument for quickly and accurately measuring the difference in elevation between spaced points.

Another object of the invention is to provide such an instrument which may be quickly and easily fabricated from relatively inexpensive materials.

Still another object of this invention is to provide such an instrument which may be easily operated, calibrated and maintained by unskilled persons.

Broadly described, the invention includes an optical instrument for measuring differences in elevation which comprises a housing positionable upon a flat surface, said housing having objective and viewing openings therein, a multiple mirror optical system mounted in said housing comprising a pair of mirror components each having an objective reflecting portion positioned for exposure to a target spaced a substantial distance from the instrument, one of said mirror components providing an even number of reflecting surfaces to reflect a normal target image and the other of said mirror components providing an odd number of at least one reflecting surface to reflect a reversed target image, said components being so positioned relative to a pair of datum planes which intersect at a predetermined angle that the emergent reflection paths of said reversed and normal images lie in the viewing datum plane when the objective datum plane intersects the target and on opposite sides of the viewing datum plane when the objective datum plane is displaced from the target, at least one of said mirror components being mounted on a movable supporting member, means adjustably connecting said supporting member to said housing for pivotal movement along axes normal to and co-directional with the intersection between said datum planes to permit calibration of said optical system, means to rotate said housing to move the objective datum plane relative to the target, and means carried by said housing to indicate the difference in elevation between the instrument and the target when the objective datum plane intersects the target.

The invention having been generally set forth, a preferred specific embodiment for the accomplishment of one or more of the stated objects and others will now be described in detail with reference to the drawings in which:

FIGURE 1 is a perspective view of the apparatus of the invention showing the optical instrument and the target stand;

FIGURE 2 is a perspective view of the target stand;

FIGURE 3 is a front elevation of the optical instrument;

FIGURE 4 is a side elevation of the optical instrument;

FIGURE 5 is a top plan view of the optical instrument with the target images in aligned relationship;

FIGURE 6 is a vertical sectional view taken along the line 6—6 of FIGURE 3;

FIGURE 7 is a vertical sectional view taken along the line 7—7 of FIGURE 6;

FIGURE 8 is a vertical sectional view taken along the line 8—8 of FIGURE 7;

FIGURE 9 is a horizontal sectional view taken along the line 9—9 of FIGURE 6; and FIGURE 10 is a top plan view of the viewing opening of the optical instrument showing the target images in disaligned relationship.

With reference to FIGURE 1, the apparatus of the invention includes an optical instrument designated generally by the reference numeral 11 and a target stand 12 which comprises an L-shaped rigid structure which may be metallic and which may be uprightly positioned on the ground. On the front of the target stand at a predetermined distance above the bottom is a target stripe 13 which preferably extends across both legs of the L-shaped target stand.

The optical instrument 11 includes a housing 14 which is generally box-shaped with a pair of objective openings 15 and 16 in its front wall and a viewing opening 17 in its top wall. The openings 15, 16 and 17 are provided with cylindrical shades 18, 19 and 20, respectively, mounted on the exterior surface of the housing 14.

Mounted within the housing, as shown in FIGURE 6, is a multiple mirror optical system, designated generally by the reference numeral 21, which is divided into a pair of mirror components 22 and 23. Mirror component 22 comprises a single mirror 24 to reflect a reversed image. Mirror component 23 comprises a pair of mirrors 31 and 32 to reflect a normal image. It will be understood that mirror component 22 may comprise any odd number of mirrors and mirror component 23 may comprise any even number of mirrors to reflect reversed and normal images, respectively. Mirrors 24 and 31 are the objective mirrors of the components 22 and 23, respectively, and face horizontally outwardly through the objective openings 15 and 16 for exposure to the target which is positioned a substantial distance away from the optical instrument. The portions of the mirrors 24 and 31 which are exposed to the target for initial reflection thereof will hereinafter be referred to as objective reflection portions.

Mirror 24 is also the viewing mirror of mirror component 22. Mirror 32 is the viewing mirror of mirror component 23. As best seen in FIGURES 5 and 7, one edge 41 of the mirror 32 is positioned below the approximate center of the viewing opening 17. Thus, the mirror 32 underlies approximately half of the viewing opening 17. The mirror 24 underlies the other half of the viewing opening 17. Accordingly, the view to an observer through the opening 17 is divided by the edge 41 with the mirror 32 on one side and the mirror 24 on the other side of such edge.

The positions of mirror components 22 and 23 are fixed with respect to a pair of imaginary datum planes 33 and 34 which intersect at a predetermined angle of preferably 90° as shown in FIGURE 6. The plane 33, hereinafter referred to as the objective datum plane, is a reference plane along which it is desired that the line of sight of the mirror system 21 be extended. Preferably the plane 33 is horizontal when the instrument 11 is level. The plane 34, hereinafter referred to as the viewing datum plane, is a reference plane preferably vertical and coincident with the longitudinal axis of the instrument 11 along which plane it is desired that rays of light be reflected by the mirror system 21, which rays are received from an object lying in objective datum plane 33. Each of the mirror components is so positioned with respect to the datum planes 33 and 34 as to receive light rays from an object lying in objective datum plane 33 at a substantial distance away from the instrument 11 and reflect such rays along viewing datum plane 34.

When the angle between the datum planes 33 and 34 is 90° as in the present embodiment, the single mirror 24 of mirror component 22 is positioned at an angle of substantially 45° from the objective datum plane to receive light rays from the target lying in the objective datum plane 33 and reflect such rays along the viewing datum plane 34. The mirror 31 of mirror component 23 is positioned in an inclined relationship relative to the objective datum plane to reflect rays of light received from an object lying in objective datum plane 33 along a path 37 which intersects viewing datum plane 34. The mirror 32 is positioned with its reflecting face intersecting viewing datum plane 34 at an angle which will receive the image reflected by the mirror 31 and again reflect such image along viewing datum plane 34. The angular relationship between the mirror component 23 and the datum planes 33 and 34 may be varied between wide limits, but the two mirrors 31 and 32 must cooperate to reflect along plane 34 rays received from an object lying in plane 33 at substantial distance from the instrument. Thus, the angle between mirrors 31 and 32 in this embodiment is substantially 45°.

With reference to FIGURE 6, it will be noted that the objective optical axes 35 and 36 of the mirror components 22 and 23 are vertically displaced below and above the objective datum plane 33, respectively. This separation of the mirror components is desirable to facilitate fabrication and calibration of the optical system but it does introduce a slight parallax error which becomes greater as the distance between the target and the instrument decreases. At substantial distances, the error due to parallax is negligible. Moreover, the mirror components are arranged so that their optical axes intersect on the objective datum plane 33 at a predetermined, substantial distance from the instrument as illustrated in foreshortened perspective in FIGURE 1. If the target is placed at the intersection of the optical axes, there will be no parallax error. For example, the optical axes may intersect the datum plane 33 at a distance of 25 feet from the instrument. It will be understood, however, that the axes may be adjusted to intersect at any desired distance. If desired, the parallax error can be eliminated regardless of the distance between the instrument and the target by placing the mirror components 22 and 23 so that their objective optical axes are coincident with the objective datum plane 33.

As shown in FIGURES 5 and 10, when the instrument 11 is directed toward the target 13, images 37 and 38 of contiguous portions of the target are reflected upwardly through the viewing window 17 by the mirror components 22 and 23. The observer sees a reversed target image 37 reflected by the mirror 24 and a normal target image 38 reflected by the mirror 32. When the objective datum plane 33 intersects the target, the contiguous images 37 and 38 will be aligned as seen in FIGURE 5. However, if the target 33 is displaced on one side or the other of the objective datum plane 33, the reversed image 37 of the target will be reflected on one side of the viewing datum plane 34 and the normal image 38 of the target will be reflected on the opposite side of the plane 34, as shown in FIGURE 10. When the housing 14 is rotated to move the objective datum plane toward the target 13, the images from the two mirror components approach each other until they become aligned when the objective datum plane intersects the target.

The rotation of the housing 14 to raise or lower the objective datum plane 33 is effected by a thumbscrew 71 which threadedly engages a bushing 72 in a boss 73 integral with a flange 74 which extends outwardly from the lower end of the housing 14.

With reference to FIGURE 6, the mirror component 22 is mounted on a supporting member 51 which is provided with a pair of side flanges 53 having opposed grooves 54 which closely embrace the edges of the mirror 24. The mirror 24 may be secured in the grooves 54 by a suitable adhesive or, alternatively, a friction fit may be provided. Integral with the lower end of the supporting member 51 is a T-shaped lug 55. The lower flange 58 of the lug 55 is frictionally received within a socket 57 provided by the grooved flanges 56 extending upwardly from the floor of the housing 14. The socket 57 is wider than the flange 58 and the space 59 between the tops of the flanges 56 is wider than the outstanding leg 60 of the T-lug 55 to permit the flange 58 to slide within the socket 57, thus rotating the supporting member 51 and the mirror 24 about an axis normal to the intersection between datum planes 33 and 34. Adjustment of the flange within the socket may be accomplished by a suitable tool inserted through the opening 15. The frictional fit of the flange 58 within the socket 57 is sufficiently tight to retain the supporting member against rotation unless an external force is applied to overcome the friction.

At the upper end of the supporting member 51 is a horizontal flange 61 which is drilled to receive the stem of an adjusting screw 62 which extends between the flange 61 and the floor of housing 14 and is secured by a nut 64. Mounted around the stem of the adjusting screw 62 is a compression spring 64 which exerts a biasing force between the flange 61 and the floor of the housing 14. When the adjusting screw 62 is rotated, the supporting member 51 and the mirror 24 is pivoted about an axis co-directional with the intersection between datum planes 33 and 34 by flexing the slightly resilient neck 60 of the T-lug 55. The screw 62 may be adjusted by a screw driver inserted through the opening 17. By the two adjustments of the mirror about the two axes as described, accurate calibration of the mirror system 21 may be effected.

The mirrors 31 and 32 of the mirror component 23 are mounted in fixed positions within the housing 14. The ends of each of the mirrors 31 and 32 are received in elongated grooves provided in flanges 65 which extend inwardly from the housing walls. The mirrors 31 and 32 are retained in such grooves by frictional fits or by suitable adhesives or any other suitable connection.

Mounted within the housing 14 below a window 81 is a spirit level 82 which is secured by a suitable adhesive to a supporting element 83 which in turn is pivotally connected to the housing wall by pin 84. Integral with the element 83 is a cam follower 85 which is retained against cam 86 by a tension spring 87. The cam 86 is mounted on shaft 87 which is journalled in a suitable bearing 88 in the wall of housing 14 and is connected at its outer end to an adjusting knob 89. Rotation of the knob 89 moves the cam 86 and the cam follower 85 to adjust the position of the spirit level 82.

With reference to FIGURE 4, the adjusting knob 89 is provided with a pointer 91 which cooperates with the scale 92. The scale 92 is calibrated in terms of inches of elevation difference between the instrument and the target when the target is positioned a predetermined substantial distance away from the instrument. For example, the scale may be calibrated to show the elevation of the instrument in terms of inches above or below the target when the target is 25 feet from the instrument. Alternatively, the dial 92 could be calibrated in terms of angular slope between the instrument and the target.

In operation, where the difference in elevation between two points a substantial predetermined distance, say twenty-five feet, apart is to be determined, the target is situated at one of the two points and the optical instrument is situated at the other with the instrument directed toward the target. Contiguous images of the target are viewed through the viewing opening 20. The image reflected by the mirror component 22 is a reversed image and the image reflected by the mirror component 23 is a normal image. If the contiguous normal and reversed images are not aligned with each other, the housing 14 is rotated about a horizontal axis by adjusting the thumbscrew 71 until the contiguous images become aligned, which indicates that the objective datum plane 33 is intersecting the target 13. Then the adjusting knob 89 is rotated until the spirit level 82 is level. The difference in elevation between the instrument and the target may then be read directly on the scale 92.

The housing 14 and the supporting member 81 with their integral connection parts 55 and 56, the supporting element 83 with its integral cam follower 85, the cam 86 and the adjusting knob 89 are each preferably molded from a resinous plastic material. Examples of materials which may be used are thermosetting resins such as phenol formaldehyde resins, urea formaldehyde resins, and the like and thermoplastic resins such as cellulose acetate, vinylidene chloride, copolymers of vinyl chloride and vinyl acetate, and the like. The thermoplastic resins are preferred.

While the invention has been described with respect to a preferred embodiment, it will be understood that various changes may be made without departing from the scope of the appended claims.

I claim:
1. An optical instrument for measuring differences in elevation which comprises a housing positionable upon a flat surface, said housing having objective and viewing openings therein, a multiple mirror optical system mounted in said housing comprising a pair of mirror components each having an objective reflecting portion positioned for exposure to a target spaced a substantial distance from the instrument, one of said mirror components providing an even number of reflecting surfaces to reflect a normal target image and the other of said mirror components providing an odd number of at least one reflecting surface to reflect a reversed target image, said components being so positioned relative to a pair of datum planes which intersect at a predetermined angle that the emergent reflection paths of said reversed and normal images lie in the viewing datum plane when the objective datum plane intersects the target and on opposite sides of the viewing datum plane when the objective datum plane is displaced from the target, at least one of said mirror components being mounted on a movable supporting member, means adjustably connecting said supporting member to said housing for pivotal movement along axes normal to and co-directional with the intersection between said datum planes to permit calibration of said optical system, means to rotate said housing to move the objective datum plane relative to the target, and means carried by said housing to indicate the difference in elevation between the instrument and the target when the objective datum plane intersects the target.

2. An optical instrument for measuring differences in elevation which comprises a housing positionable upon a flat surface, said housing having objective and viewing openings therein, a multiple mirror optical system mounted in said housing comprising a pair of mirror components each having an objective reflecting portion positioned for exposure to a target spaced a substantial distance from the instrument, one of said mirror components providing an even number of reflecting surfaces to reflect a normal target image and the other of said mirror components providing an odd number of at least one reflecting surface to reflect a reversed target image, said components being so positioned relative to a pair of datum planes which intersect at a predetermined angle that the emergent reflection paths of said reversed and normal images lie in the viewing datum plane when the objective datum plane intersects the target and on opposite sides of the viewing datum plane when the objective datum plane is displaced from the target, at least one of said mirror components being mounted on a movable supporting member, a two-part connecting means between one end of said supporting member and said housing comprising a flange frictionally rotatable in a socket to pivot said supporting member about an axis normal to the intersection between said datum planes, said connection means also permitting rotation of said supporting member about an axis co-directional with the intersection between said datum planes, screw means to adjustably rotate said supporting member about said last-named axis, and means carried by said housing to indicate the difference in elevation between the instrument and the target when the objective datum plane intersects the target.

3. The apparatus of claim 2 wherein said housing and said connecting members each are a stiff synthetic resinous material with one part of said two-part connecting means being integral with said housing and the other part being integral with said supporting member.

4. The apparatus of claim 2 wherein said means to indicate difference in elevation comprises a spirit level connected to said housing for rotation about a horizontal axis normal to said objective datum plane, an adjusting knob rotatably mounted outside of said housing, means including a cam to transmit rotation from said knob to said spirit level, and dial means associated with said adjusting knob calibrated to indicate said difference in elevation.

5. The apparatus of claim 4 wherein said dial is calibrated in terms of linear distance.

References Cited in the file of this patent

UNITED STATES PATENTS

| | | |
|---|---|---|
| 1,125,053 | Brautigam | Jan. 19, 1915 |
| 1,964,408 | Stouffer et al. | June 26, 1934 |
| 2,055,684 | Eppenstein | Sept. 29, 1936 |
| 2,284,831 | McCanlies | June 2, 1942 |
| 2,607,260 | Cowley | Aug. 19, 1952 |